(12) United States Patent
Latypov

(10) Patent No.: US 8,089,038 B1
(45) Date of Patent: Jan. 3, 2012

(54) RETICLE IMAGE GENERATION USING POLARIZERS AND METAMATERIAL FILTERS

(75) Inventor: Azat M. Latypov, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 798 days.

(21) Appl. No.: 12/109,324

(22) Filed: Apr. 24, 2008

(51) Int. Cl.
*H01J 3/14* (2006.01)
*G02F 1/01* (2006.01)

(52) U.S. Cl. .................................... 250/216; 250/225

(58) Field of Classification Search .............. 250/216, 250/559.4, 548, 225, 237 R; 359/563, 566, 359/568, 569
See application file for complete search history.

(56) References Cited

U.S. PATENT DOCUMENTS

2006/0126183 A1* 6/2006 Hasman .................. 359/573
2008/0062427 A1* 3/2008 Ohsaki et al. ............ 356/491
* cited by examiner

*Primary Examiner* — Thanh X Luu
(74) *Attorney, Agent, or Firm* — Luedeka, Neely & Graham, P.C.

(57) ABSTRACT

Methods and apparatus relating to generating reticle inspection images are described. In an embodiment, a reticle inspection image is generated by filtering incident light through a metamaterial filter. Other embodiments are also described.

17 Claims, 4 Drawing Sheets

RETICLE IMAGE GENERATION USING POLARIZERS AND METAMATERIAL FILTERS

FIELD

The subject matter described herein generally relates to the generation of reticle and/or photomask inspection images. In one embodiment, some of the techniques described herein may be utilized to generate inspection images of a reticle and/or photomask by using metamaterial filters.

BACKGROUND

When inspecting photomasks or reticles, optics may be used to magnify the image of the photomask and/or reticle so that the image may be analyzed by an inspection tool. The inspection optics may need to magnify the image so that the image details may be resolved on a pixelized light sensor. However, in magnifying the image of the photomask and/or reticle, the image becomes subject to the vector effects of image formation, which may be different from the same effects in the case of the demagnified image generated by the lithography stepper tool, for example. In addition to difference in magnification factors, the image formed by the lithography stepper tool may be formed in the layer of a light sensitive resist, and this image may be affected by multiple reflections occurring in this resist layer. Hence, the magnified image of the photomask and/or reticle may not represent accurately the image from the same photomask generated by the lithography stepper tool, which may make it unsuitable for the purpose of photomask and/or reticle inspection. To this end, generating a magnified image of the photomask and/or reticle accurately representing the image generated by the lithography stepper tool in the resist layer may be essential to the inspection process.

SUMMARY

In accordance with some embodiments, techniques for generating an enlarged image of a reticle (which may be referred to herein interchangeably as a "photomask") are described. In an embodiment, generating an accurate enlarged image of a reticle is accomplished through the use of metamaterial filters. Generally, metamaterial is a material that has a manmade periodic cellular structure designed to produce the required responses, not available in nature, to specific excitations. E.g. optical metamaterial filters may provide given spatial variation of amplitude and phase transmissions for two orthogonal components of the normally incident plane wave. More generally, optical metamaterial filter may realize a spatially varying transmission Jones matrix.

In one embodiment, an apparatus may include a metamaterial filter to filter an electromagnetic beam (e.g., light). Additionally, the apparatus may include a polarizer (e.g. a wire-grid polarizer) to polarize light.

In another embodiment, a method may filter an electromagnetic beam using a metamaterial filter and capture an image of a photomask based on the filtered electromagnetic beam. Additionally, the electromagnetic beam may be polarized using a polarizer (e.g. a wire-grid polarizer) prior to filtering the electromagnetic beam with the metamaterial filter.

Additional advantages, objects, and features of embodiments of the invention are set forth in part in the detailed description which follows. It is to be understood that both the foregoing general description and the following detailed description are merely exemplary of embodiments of the invention, and are merely intended to provide an overview or framework for understanding the nature and character of embodiments of the invention.

BRIEF DESCRIPTION OF THE DRAWINGS

The accompanying drawings are included to provide further understanding of embodiments of the invention, illustrate various embodiments of the invention, and together with the description serve to explain the principles and operation of the invention. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of embodiments of the invention. Embodiments of the invention may be practiced without some or all of these specific details. In other instances, well known process operations have not been described in detail in order not to unnecessarily obscure embodiments of the invention.

Also, reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Figure 1:
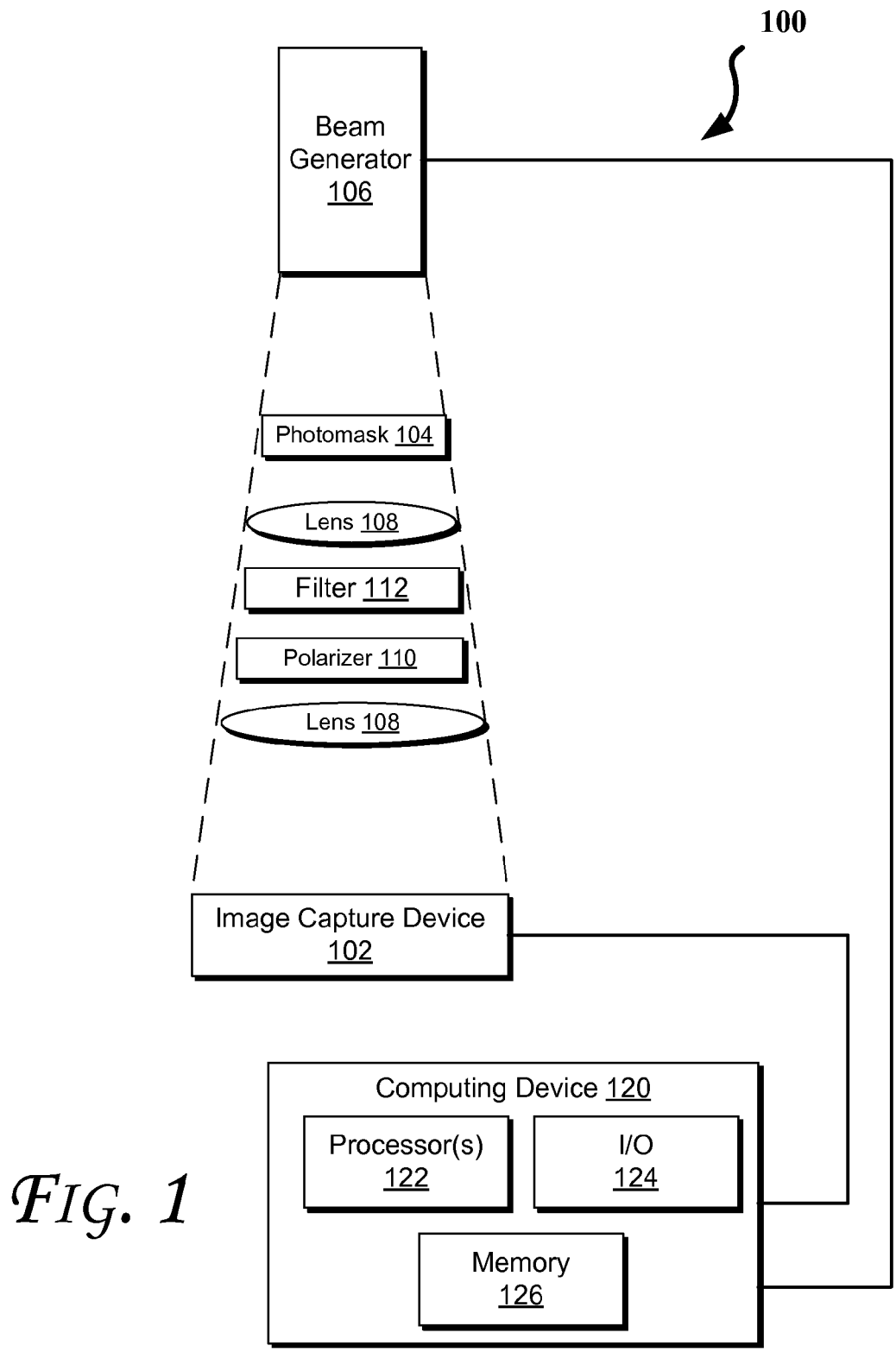
FIG. 1 illustrates a diagram of a reticle imaging system, according to an embodiment.

FIG. 1 illustrates a diagram of a reticle (which may also be referred to herein more as a "photomask") inspection system 100 in accordance with an embodiment of the invention. In various embodiments, the system 100 may be used to filter an electromagnetic beam (e.g., "light") to generate an inspection image of a reticle, such as discussed further herein with reference to FIGS. 1-4, for example.

As shown in FIG. 1, the system 100 may include an image capture device 102 to capture an image of a photomask 104. The photomask 104 may be patterned by a pattern generating tool (not shown). The device 102 may capture an image of the photomask 104 using a beam generator 106 which may be any type of a beam generator such as an optical beam generator or an electron beam generator. In an embodiment, the system 100 may optionally include one or more lenses 108 to focus the beam generated by the beam generator 106. For example, two lenses 108 may be used with the metamaterial filter 112 and the polarizer 110 positioned between the two lenses 108 and where the metamaterial filter 112 and the polarizer 110 may be at the pupil plane. Furthermore, the lens 108 may be provided at various locations. For example, the lens 108 may be provided between the photomask 104 and the image capture device 102 (as shown in FIG. 1). Alternatively, the lens 108 may be provided between the photomask 104 and the beam generator 106. Also, in multiple lens systems, one or more of the lenses may be provided between the generator 106 and the photomask 104, between the photomask 104 and the device 102, or any combinations thereof.

The system 100 may additionally include a computing device 120 to control some or all of the operations of the system 100. Alternatively, a standalone computing device may be used to perform reticle analysis offline from reticle inspection system. The computing device 120 may include one or more processors 122, an input/output (I/O) module 124, and/or a memory 126 (which may be a volatile and/or nonvolatile memory). For example, the I/O module 124 may communicate with various components of the system 100, while the processors 122 may process the communicated data and the memory 126 may store the communicated data. As shown in FIG. 1, the computing device 120 may control and/or communicate with the beam generator 106 and/or the image capture device 102. For example, the computing device 120 may cause the beam generator 106 to generate a beam at a desired wavelength and/or for a certain time period. Moreover, the computing device 120 may cause the image capture device 102 to capture an image of the photomask 104 for further processing.

The system 100 may also include a metamaterial filter 112 and a polarizer 110, according to an embodiment. In some embodiments, the metamaterial filter 112 may comprise cells formed out of a layer of metallic film (e.g., aluminum or chrome) on top of a substrate (e.g., quartz), as will be discussed further herein, e.g., with reference to FIGS. 1-4. The metallic film may be etched to create gaps to polarize light as it passes through the film. For example, the metallic film may be etched to create gaps in the metallic film oriented either along the X or the Y axis to polarize the incident light (for example where X and Y axis are perpendicular to each other in a two-dimensional coordinate system). Furthermore, the material of the metallic film and its thickness may be selected so that the gaps may provide a sufficient polarizing effect. In some embodiments, the width of the gaps may be a fraction of a wavelength of the incident light. In an embodiment, the metamaterial filter 112 may include a layer of refractive material. In some embodiments, the polarizer 110 (e.g., a wire-grid polarizer) may be used to polarize the light after the light is filtered by the metamaterial filter 112. In alternative embodiments, the position of the filter 112, polarizer 110, and/or the one or more lenses 108 may be varied.

Figure 2:
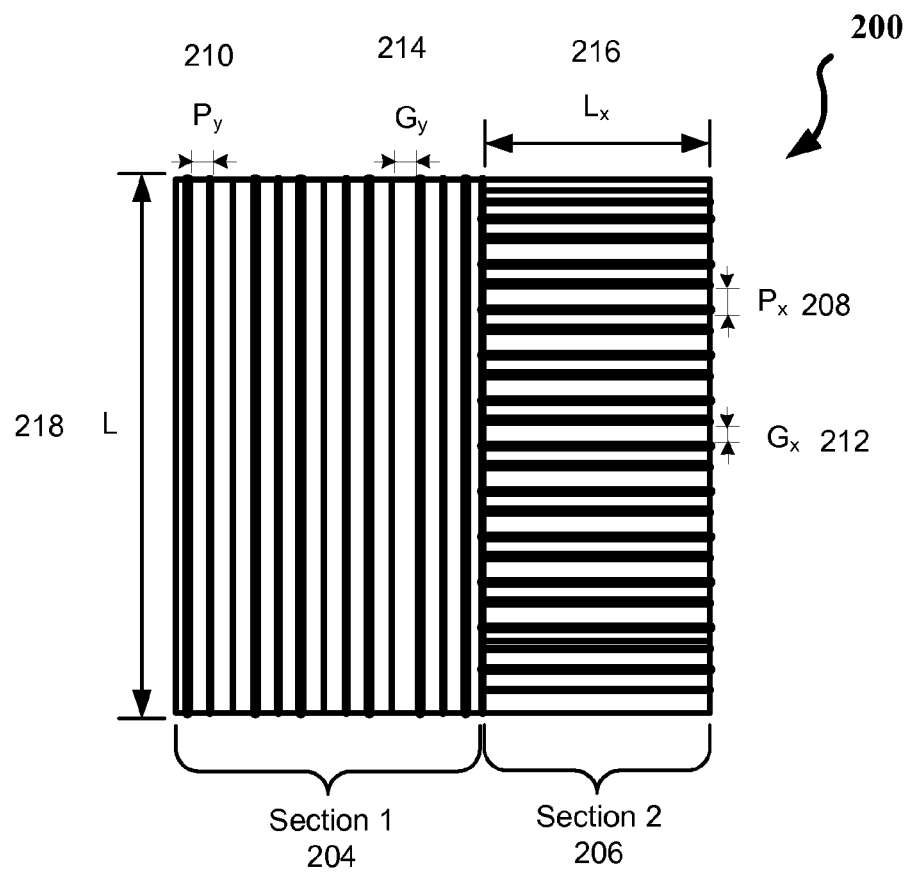
FIG. 2 illustrates a cell of a metamaterial filter, according to an embodiment.

FIG. 2 is an illustration of a cell 200 of a metamaterial filter, according to an embodiment. In one embodiment, the cell 200 may form a component discussed with reference to FIGS. 1 and 4 (such as the filter 112). According to an embodiment, a metamaterial filter may be comprised of a plurality of cells 200 etched into the metallic film layer of the metamaterial filter. Each individual cell may be divided into two sections such as shown in FIG. 2. For example, a square or rectangular cell may be divided into two rectangular sections, Section 1 (204) and Section 2 (206). Furthermore, Section 1 (204) may have gaps etched in the metallic film along a first axis and Section 2 (206) may have gaps etched in the metallic film along a second axis. Each of the gaps in the first section and the gaps in the second section may polarize light in an orientation different than that of the other section when light passes through the gaps. For example, Section 1 (204) may polarize light along a first axis and Section 2 (206) may polarize light along a second axis where the first axis and the second axis may be perpendicular to each other in a two-dimensional coordinate system.

The cell 200 may additionally include the aforementioned subsections where the gaps are placed periodically with pitches $P_x$ 208 and $P_y$ 210, in an embodiment. Furthermore, in order to polarize the light, the widths of the gaps $G_x$ 212 and $G_y$ 214 may be fractions of the wavelength of the incident light. In some embodiments, the transmission of both X or Y polarized light may be individually varied by changing the widths of the gaps $G_x$ 212 and $G_y$ 214 relative to the pitches $P_x$ 208 and $P_y$ 210, and by changing the relative dimension of the rectangular parts of the pattern by varying the parameter $L_x$ 220. In some embodiments, the dimension of the cell L 218 may be quite large compared to the dimension of the wavelength. In some embodiments, the widths of each $G_x$ 212 and $G_y$ 214 may be varied to provide for various amplitude transmissions of X and Y polarizations across the cell 200.

The cell 200 may also include a layer of refractive material coupled to the metallic layer and a substrate to modify the phase of the incident light. For example, the refractive material layer may be attached to the metallic layer, the substrate, or both. In some embodiments, the refractive layer may be of one thickness for Section 1 (204) of the cell 200 and a different thickness for Section 2 (206) of the cell 200. This arrangement of the refractive layer may vary the phase of the incident light across the cell 200 and across the metamaterial filter. In some embodiments, the various orientations of the polarized light, the variations in the width of the gaps, and the variation in the thickness of the refractive layer may allow for independent manipulation of both phase and amplitude transmission of X and Y polarized light components for each cell.

Figure 3:
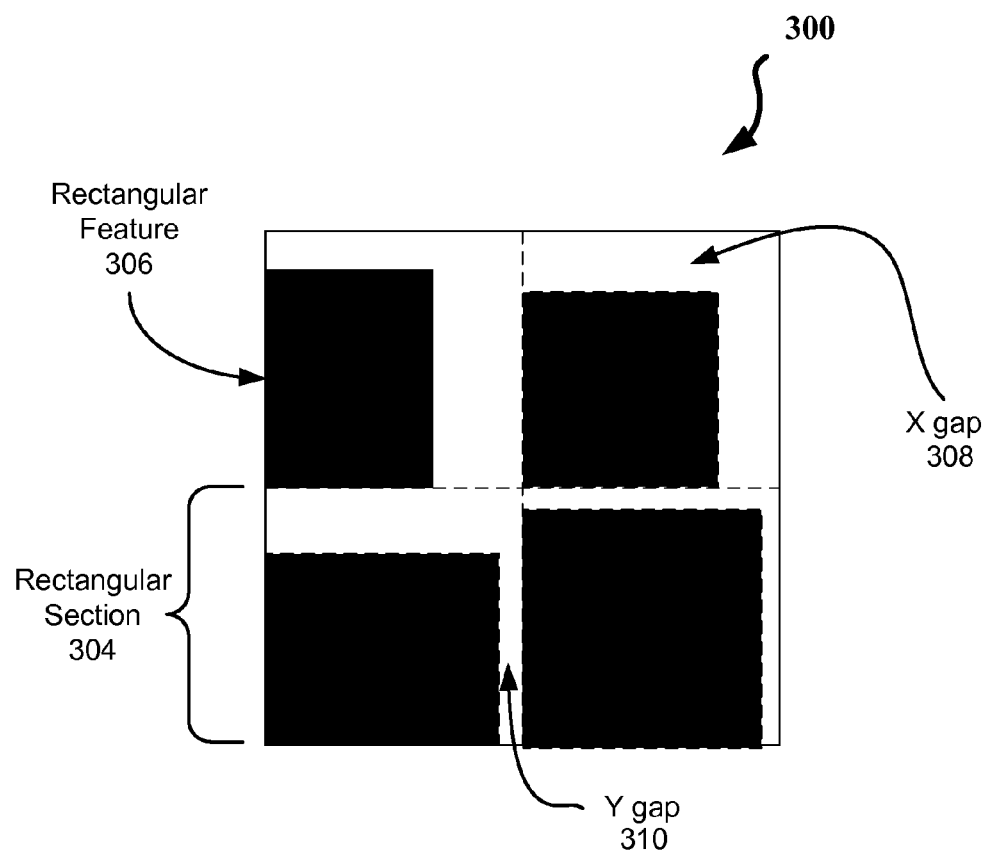
FIG. 3 illustrates a cell of a metamaterial filter, according to an embodiment.

FIG. 3 is an illustration of a metamaterial filter cell 300, according to an embodiment. In one embodiment, the cell 300 may be a component discussed with reference to FIGS. 1 and 4 (such as the filter 112). As shown in FIG. 3, the metamaterial filter cell 300 may be comprised of one or more rectangular sections 304, according to an embodiment. Each rectangular section 304 may have a rectangular feature 306 that may block the transmission of light through the cell 300. When placed adjacent to other rectangular sections 304 and other rectangular features 306, an X gap 308 and a Y gap 310 may be formed in the rectangular section 304. The X gap 308 and the Y gap 310 may be etched into the metallic film layer of the metamaterial filter to allow light to pass through the filter. The X gap 308 and the Y gap 310 may be a fraction of a wavelength of the incident light to polarize the light as it passes through the metamaterial filter. In some embodiments, the width of the X gap 308 and the Y gap 310 for each rectangular section may be varied to modify the amplitude of the X and Y polarizations of the incident light.

The cell 200 may also include a layer of refractive material coupled to the metallic layer and a substrate to modify the phase of the incident light. For example, the refractive material layer may be attached to the metallic layer, the substrate, or both. In some embodiments, the refractive layer may have a consistent thickness across the cell 300 and may have etched gaps in it so that the refractive film covers only a certain portion of either X gaps 308 or Y gaps 310 in the metallic film. In another embodiment, the thickness of the refractive film is varied over each cell so that each X gap 308 or Y gap 310 in the metallic film transmits the light with phases different than other X gaps 308 or Y gaps 310. In some embodiments, the various orientations of the polarized light, the variations in the width of the gaps, and the variation in the thickness of the refractive layer may allow for independent manipulation of both phase and amplitude transmission of X and Y polarized light components for each cell.

Figure 4:
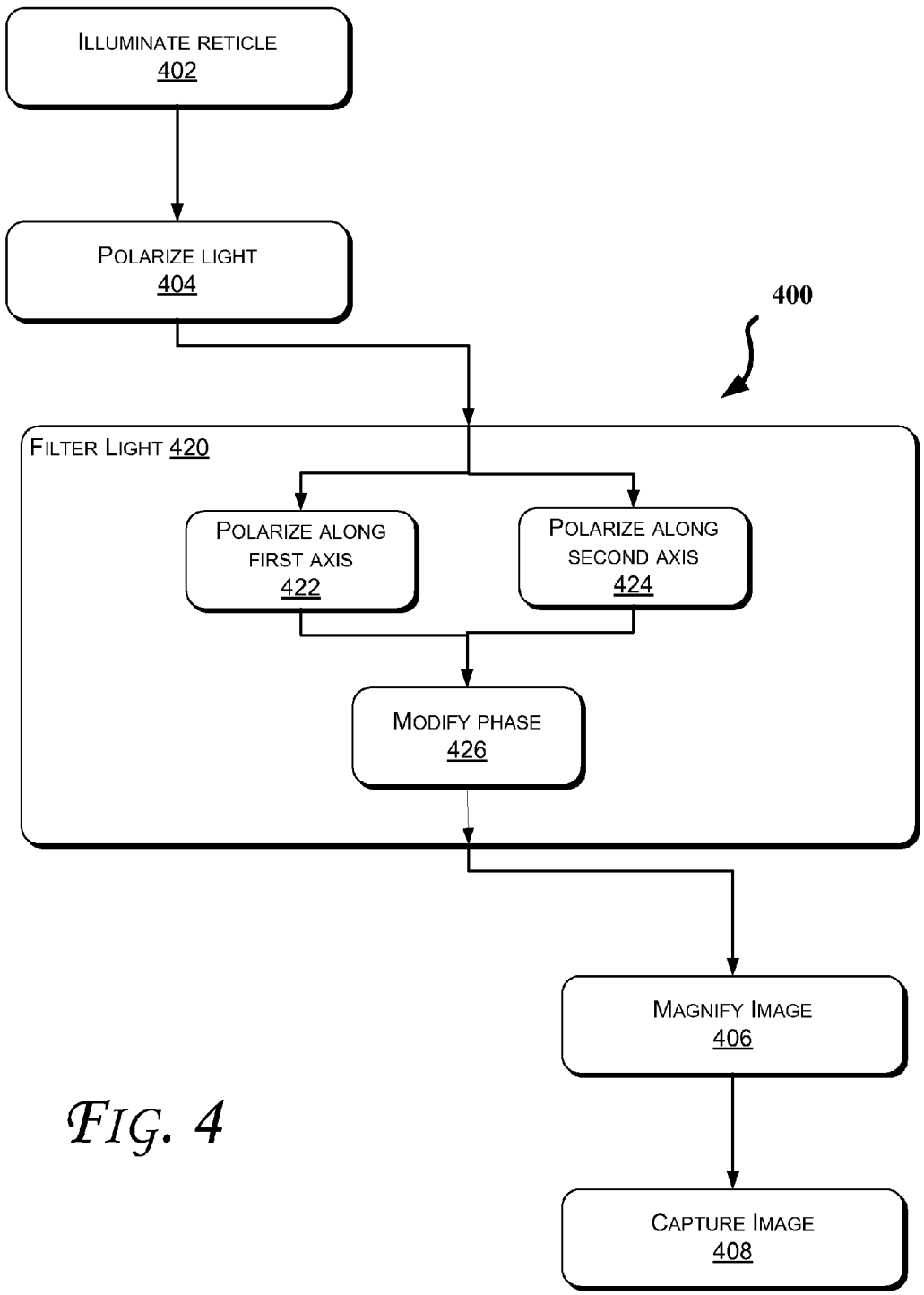
FIG. 4 is a flow diagram of a method according to an embodiment.

FIG. 4 illustrates a flow diagram of an embodiment of a method 400 to filter light to reproduce the vector effects in the lithography stepper image formation, including for example the effects of the stepper image formation due to the layer of resist on the wafer, when generating a reticle inspection image. In one embodiment, various operations discussed with reference to FIG. 4 may be performed by at least some of the components discussed with reference to FIGS. 1, 2, and/or 3.

Referring to FIGS. 1-4, at an operation 402, an electromagnetic beam (e.g., light) is used to illuminate the reticle to be inspected. In some embodiments, at an operation 404, the light may be polarized by a polarizer (e.g., a wire-grid polarizer). For example, polarizing the electromagnetic beam with the polarizer before filtering may result in a reduction of the number of reticle images needed to produce a relatively accurate reticle inspection image.

At an operation 420, the light is filtered through a plurality of cells in a metamaterial filter. In an embodiment, operation 420 may include one or more cells polarizing the light along a first axis 422, polarizing the light along a second axis 424, and/or modifying the phase of the light 428 as the light passes through the one or more cells. In some embodiments, the first axis and second axis may be perpendicular to each other in a two-dimensional coordinate system. Moreover, each cell in the metamaterial filter may allow different polarizations, amplitudes, and/or phases of light to pass through the filter than other cells in the filter. Additionally, the transmission of different polarizations of light may be achieved by allowing the light to pass through gaps etched in the cells of the metamaterial filter where the gaps are oriented along various axes (e.g., a first and a second axis where the first and second axes are perpendicular to each other or at another angle). Furthermore, the amplitude of the transmitted light may be varied by varying the widths of the gaps etched in the filter. Additionally, the phase of the light may be modified by passing the light through a layer of refractive material that has varying thickness across the metamaterial filter.

Once the light is filtered, at an operation 420, the image of the reticle based on the light may be magnified at operation 406 through projection optics (e.g., a microscope). At an operation 408, the filtered and magnified image of the reticle may be captured for inspection. For example, varying the polarization, amplitude, and/or phase of the light through the use of the metamaterial filter described above may allow to properly emulate the vector effects in image formation in the lithography stepper, including the effects due to the presence of the resist layer at the location where the stepper image is formed. By using such a metamaterial filter, the inspection tool may obtain the inspection image, or a combination of inspection images (e.g., taken from the same area of reticle), which accurately emulates the image formed by the lithographic stepper tool in the layer of resist in some embodiments. The use of the specially designed metamaterial filters may result in a reduction in the number of the images needed to be taken from the same area of the reticle in accordance with an embodiment. Such reduction in the number of images to be taken may be beneficial, in part, because it may make the inspection process faster and/or reduce the error associated with the need to combine multiple images.

In various embodiments of the invention, the operations discussed herein, e.g., with reference to FIGS. 1-4, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed herein.

Additionally, such computer-readable media may be downloaded as a computer program product, wherein the program may be transferred from a remote computer (e.g., a server) to a requesting computer (e.g., a client) by way of data signals embodied in propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Although embodiments have been described in language specific to structural features and/or methodological acts, it is to be understood that claimed subject matter may not be limited to the specific features or acts described. Rather, the specific features and acts are disclosed as sample forms of implementing various embodiments. While the invention has been described above in conjunction with one or more specific embodiments, it should be understood that the invention is not intended to be limited to one embodiment. The invention is intended to cover alternatives, modifications, and equivalents as may be included within the spirit and scope of the invention, such as those defined by the appended claims.

The invention claimed is:

1. An apparatus comprising:
   a beam generator to generate an electromagnetic beam to illuminate a reticle;
   a metamaterial filter to filter the electromagnetic beam, wherein the metamaterial filter comprises;
   a substrate;
   a metallic film, wherein the metallic film comprises a plurality of gaps etched into the metallic film to filter the electromagnetic beam, wherein each of the plurality of gaps has a width that is a fraction of a wavelength of the electromagnetic beam; and
   a film of refractive material coupled to the metallic film and the substrate; and
   an image capture device to capture an image of the reticle through the metamaterial filter.

2. The apparatus of claim 1, further comprising a polarizer to polarize the electromagnetic beam after the electromagnetic beam is filtered by the metamaterial filter.

3. The apparatus of claim 1, wherein the metallic film has a varying thickness in a first plane that is perpendicular to a first axis of a two-dimensional plane.

4. The apparatus of claim 1, wherein the film of refractive material is of varying thickness across the metamaterial filter to vary the phase transmission of the electromagnetic beam through the metamaterial filter.

5. The apparatus of claim 4, wherein each of the plurality of cells is divided into a first area and a second area, wherein the first area comprises a plurality of gaps etched periodically along a first axis, wherein the second area comprises a plurality of gaps etched periodically along a second axis.

6. The apparatus of claim 4, wherein each of the plurality of cells is divided into one or more rectangular sections, wherein each section has a rectangular feature that forms a first gap along a first axis and a second gap along a second axis when placed adjacent to the rectangular feature of an adjacent section.

7. The apparatus of claim 1, wherein the metamaterial filter comprises a plurality of cells.

8. A method comprising:
illuminating a reticle with an electromagnetic beam;
filtering the electromagnetic beam through a metamaterial filter, wherein the metamaterial filter comprises;
a substrate;
a metallic film, wherein the metallic film comprises a plurality of periodic gaps etched into the metallic film to filter the electromagnetic beam, wherein each of the plurality of periodic gaps has a width that is a fraction of a wavelength of the electromagnetic beam; and
a film of refractive material coupled to the metallic film and the substrate; and
capturing one or more images of the reticle based on the filtered electromagnetic beam.

9. The method of claim 8, further comprising polarizing the electromagnetic beam before filtering the electromagnetic beam through the metamaterial filter.

10. The method of claim 8, wherein the filtering causes the amplitude and phase attenuation of the electromagnetic beam to vary from one point on the metamaterial filter to another point on the metamaterial filter.

11. The method of claim 8, wherein the filtering causes the amplitude and phase attenuation to be different for an x-component and a y-component of the electromagnetic beam at each point on the metamaterial filter.

12. The method of claim 8, wherein the filtering comprises passing the electromagnetic beam through a plurality of cells in the metamaterial filter.

13. The method of claim 12, further comprising each of the plurality of cells transmitting electromagnetic beams of different amplitudes and phases than other cells.

14. The method of claim 12, further comprising:
polarizing an x-component of the electromagnetic beam by passing the electromagnetic beam through a first portion of the plurality of periodic gaps along a first axis in a first section of each of the plurality of cells; and
polarizing a y-component of the electromagnetic beam by passing the electromagnetic beam through a second portion of the plurality of periodic gaps along a second axis in a second section of each of the plurality of cells,
wherein the x component is provided in a first axis that is perpendicular to the a second axis corresponding to the y-component.

15. The method of claim 12, further comprising:
varying the amplitude of the polarized x-component and the polarized y-component across the metamaterial filter by passing the electromagnetic beam through the plurality of periodic gaps along the first axis and along the second axis, wherein each of the plurality of periodic gaps transmits electromagnetic beams of different amplitudes; and
varying the phase of the electromagnetic beam across the metamaterial filter by passing the electromagnetic beam through a film of refracting material of varying thickness in the metamaterial filter.

16. The method of claim 12, further comprising:
polarizing an x-component and a y-component of the electromagnetic beam by passing the electromagnetic beam through one or more rectangular sections in each of the plurality of cells, wherein the polarization comprises transmitting the electromagnetic beam through a gap along a first axis and a gap along a second axis in each of the one or more rectangular sections generated by a rectangular feature within each of the one or more rectangular sections and the rectangular feature in the adjacent rectangular section;
varying the amplitude of the polarized x-component and y-component by passing the electromagnetic beam through the gap along the first axis and the gap along the second axis, wherein the gap along the first axis and the gap along the second axis transmit electromagnetic beams of different amplitudes;
varying the phase of the electromagnetic beam across the metamaterial filter by passing the electromagnetic beam through a film of refracting material of varying thickness in the metamaterial filter.

17. The method of claim 8, further comprising combining the one or more images to form a single image.

* * * * *